(12) United States Patent
Kim et al.

(10) Patent No.: US 8,301,166 B2
(45) Date of Patent: Oct. 30, 2012

(54) METHOD AND APPARATUS FOR LOCATION BASED MULTIMEDIA MESSAGE SERVICE

(75) Inventors: Kyung-Sul Kim, Yongin-si (KR); Sang-Woo Han, Seoul (KR)

(73) Assignee: KT Corporation, Gyeonggi-do (KR)

( * ) Notice: Subject to any disclaimer, the term of this patent is extended or adjusted under 35 U.S.C. 154(b) by 683 days.

(21) Appl. No.: 12/488,262

(22) Filed: Jun. 19, 2009

(65) Prior Publication Data

US 2009/0258659 A1      Oct. 15, 2009

Related U.S. Application Data

(63) Continuation of application No. PCT/KR2007/006744, filed on Dec. 21, 2007.

(30) Foreign Application Priority Data

Dec. 22, 2006  (KR) .................. 10-2006-0133185

(51) Int. Cl.
*H04W 64/00* (2009.01)
(52) U.S. Cl. .................. 455/456.3; 455/456.1; 370/315
(58) Field of Classification Search .............. 455/412.2, 455/3.06, 435.1, 431, 456.1, 456.3; 370/315, 370/320
See application file for complete search history.

(56) References Cited

U.S. PATENT DOCUMENTS

| | | | |
|---|---|---|---|
| 2004/0008657 | A1 | 1/2004 | Lee et al. |
| 2004/0038691 | A1 | 2/2004 | Shin |
| 2004/0063400 | A1* | 4/2004 | Kim et al. .................. 455/3.06 |
| 2006/0171369 | A1 | 8/2006 | Ostrup et al. |
| 2007/0275742 | A1 | 11/2007 | Zhang |

FOREIGN PATENT DOCUMENTS

| | | |
|---|---|---|
| JP | 2004-166197 | 6/2004 |
| KR | 10-2001-0004512 | 1/2001 |
| KR | 10-2005-0098199 | 10/2005 |
| WO | WO 2006/010325 | 2/2006 |
| WO | WO 2006/083207 | 8/2006 |

OTHER PUBLICATIONS

International Search Report for International Application No. PCT/KR2007/006744 dated Mar. 14, 2008 by Korean Intellectual Property Office.
Japan Patent Office, Office Action for Japan Patent Application No. 2009-542657, Oct. 11, 2011.

* cited by examiner

*Primary Examiner* — Phuoc Doan
(74) *Attorney, Agent, or Firm* — IP Legal Services, LLC (57) ABSTRACT

A multimedia message service method and a server therefor are disclosed. In one embodiment, the server i) allows a broadcast transmitting server to receive a request of transmitting a position-based multimedia message from a content providing server, ii) collects information related to a base station covering an area to which the requested position-based multimedia message is desired to be transmitted, iii) transfers the position-based multimedia message to a multimedia transmitting equipment, iv) collects address information of the position-based multimedia message from the multimedia transmitting equipment and v) transmits the collected address information in a form of a cell broadcast service message to a receiving mobile communication terminal according to the information related to the base station. According to one embodiment, a large-sized multimedia message can be easily provided to a plurality of mobile communication terminals located in an area by using a cell broadcasting service.

15 Claims, 6 Drawing Sheets

METHOD AND APPARATUS FOR LOCATION BASED MULTIMEDIA MESSAGE SERVICE

RELATED APPLICATIONS

This application is a continuation application, and claims the benefit under 35 U.S.C. §§120 and 365 of PCT Application No. PCT/KR2007/006744, filed on Dec. 21, 2007, which is hereby incorporated by reference. PCT/KR2007/006744 also claimed priority from Korean Patent Application No. 10-2006-0133185, filed on Dec. 22, 2006, which is hereby incorporated by reference.

BACKGROUND OF THE INVENTION

1. Field of the Invention

The present invention relates to a multimedia message service method, more specifically to a position based multimedia message transmitting method and a server therefor that can easily provide a large sized multimedia message to a plurality of mobile communication terminals which are located at a position.

2. Description of the Related Technology

In a mobile communication system, a written message is transmitted through a short message service (SMS) or a cell broadcasting service (CBS). Here, the short message service refers to the point-to-point type message service to communicate a short message between mobile communication terminals. The short message service can perform the storing and transferring functions of a short message service center (SMSC) and use code division multiple access (CDMA) access/paging and traffic channels.

However, the cell broadcasting service refers to the point-to-multi-type single direction call or the multi-recipient messaging service to transmit a message to mobile communication terminals of a particular area or group by using a paging channel of a wireless channel at a time. The cell broadcasting service is mainly used to provide information such as broadcasting advertisement, weather and traffic news, which are intended for unspecified individuals.

SUMMARY OF CERTAIN INVENTIVE ASPECTS

One aspect of the invention is a position-based method of transmitting a large sized multimedia message and a server therefor in a mobile communication system.

Another aspect of the present invention is a position based multimedia message transmitting method which can include allowing a broadcast transmitting server to receive a request of transmitting a position-based multimedia message from a content providing server; collecting information related to a base station covering an area to which the requested position-based multimedia message is desired to be provided; transferring the position-based multimedia message to a multimedia transmitting equipment; collecting address information of the position-based multimedia message from the multimedia transmitting equipment; and transmitting the collected address information in a form of a cell broadcasting service message to a receiving mobile communication terminal, located in the area, according to the information related to the base station.

Another aspect of the present invention is a broadcast transmitting server which can include a multimedia message module, receiving position-based multimedia message information from a content providing server; a position information module, collecting information related to a base station covering an area, to which a position-based multimedia message that is requested to be transmitted from the content providing server, is desired to be provided; and a broadcast module, transferring the position-based multimedia message to a multimedia transmitting equipment, collecting address information of the position-based multimedia message from the multimedia transmitting equipment and transmitting the collected address information in a form of a cell broadcast service message to a receiving mobile communication terminal located in the area, according to the information related to the base station.

Another aspect of the invention is a broadcast transmitting server, comprising: a first device configured to receive position-based multimedia message information from a content providing server; a second device configured to obtain information related to a base station covering an area, to which a position-based multimedia message that is requested to be transmitted from the content providing server is provided; and a third device configured to i) transmit the position-based multimedia message to a multimedia transmitting equipment, ii) obtain address information of the position-based multimedia message from the multimedia transmitting equipment and iii) transmit the address information to a receiving mobile communication terminal located in the area, according to the base station information.

Another aspect of the invention is a broadcast transmitting server, comprising: means for receiving position-based multimedia message information from a content providing server; means for obtaining information related to a base station covering an area, to which a position-based multimedia message that is requested to be transmitted from the content providing server is provided; and means for transmitting the position-based multimedia message to a multimedia transmitting equipment; means for obtaining address information of the position-based multimedia message from the multimedia transmitting equipment; and means for transmitting the address information to a receiving mobile communication terminal located in the area, according to the information related to the base station.

In the above servers, the address information comprises at least one of the following: i) a uniform resource locator (URL) address of the multimedia message, ii) an IP address of the multimedia transmitting equipment and iii) message ID information of the multimedia transmitting equipment.

DETAILED DESCRIPTION OF CERTAIN INVENTIVE EMBODIMENTS

The efficiency of the mobile communication system and the mobile communication terminal has been recently improved. This makes it possible to provide various application services related to multimedia data such as motion pictures, characters, images and melodies to meet users' needs. Today's trends show that the size of the provided data is increasing to provide better quality of image and voice services.

A multimedia message service (MMS) has been suggested to solve the above problem. Using the multimedia message service makes it possible to provide a large sized multimedia message of mega bytes to a receiver mobile communication terminal through a multimedia message service center (MMSC).

Transmitting a position-based massage is performed by mapping the message to a certain area by using information related to a base station and then transmitting the message to a mobile communication terminal in the area. Here, the information related to the base station is the smallest unit of a mobile communication network, and the area can be administrative divisions such as municipality, province, county, distinct, village or a particular place such as the Incheon International Airport.

However, in the current CDMA or WCDMA system the large sized multimedia message is finally provided to the receiver mobile communication terminal, only if the multimedia message service center receives a NOTI-message from a receiver mobile communication terminal.

Accordingly, the current mobile communication system is unable to support the position-based service of transmitting the large sized multimedia message sufficiently.

Also, the current position-based cell broadcasting service capable of transmitting a message can process data having merely 512 bytes in the CDMA system or merely 1296 bytes in the WCDMA.

Hereinafter, some embodiments of the present invention will be described in detail with reference to the accompanying drawings. Throughout the drawings, similar elements are given similar reference numerals.

Throughout the description, when a part is described as being "connected" to another part, it shall be construed not only as being "directly connected" to the other part but also as placing an element in between and being "electrically connected" to the other part. Also, when a part is described as "comprising (or including)" an element, unless otherwise described especially, the expression of "comprising (or including)" indicates not the exclusion of another element but the possibility of further inclusion of another element.

The term indicating a module used in the description refers to the unit by which a certain function or operation is processed. The module can be realized by hardware, software or a combination thereof.

Firstly, the structure of a system for providing a position-based multimedia message will be described with reference to FIG. 1.

Figure 1:
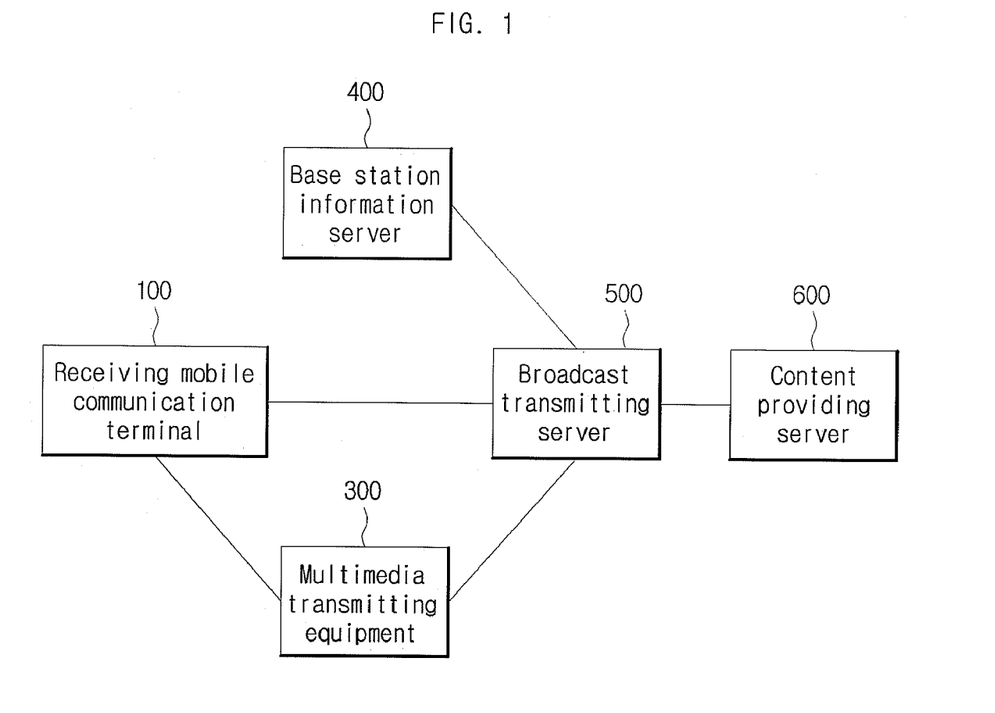
FIG. 1 is a block diagram illustrating a system for providing a position-based multimedia message service in accordance with an embodiment of the present invention.

FIG. 1 is a block diagram illustrating a system for providing a position-based multimedia message service in accordance with an embodiment of the present invention.

Referring to FIG. 1, the system for providing a position-based multimedia message can include a receiving mobile communication terminal 100, a multimedia transmitting equipment 300, a base station information server 400, a broadcast transmitting server 500 and a content providing server 600.

The content providing server 600 can generate multimedia contents including motion pictures, characters, images and melodies. Here, the generated contents are provided to the broadcast transmitting server 500, which will be described later.

In one embodiment, the provided contents can be transmitted to the receiving mobile communication terminal 100, which is located in administrative jurisdiction, such as municipality, province, county, district, village, or in a particular place, such as the Incheon International Airport.

The broadcast transmitting server 500 receives multimedia content data from the content providing server 600. The broadcast transmitting server 500 provides the content data in a form of a cell broadcasting service (CBS) message to a mobile communication terminal located within an area.

The broadcast transmitting server 500 receives a multimedia message transmitting request from the content providing server 600.

If the multimedia message transmitting request is received, the broadcast transmitting server 500 collects information related to a position of a base station covering an area, in which the receiver mobile communication terminal 100 is located, from the base station information server 400.

The broadcast transmitting server 500 can store the multimedia message in a separate storage device. At this time, the separate storage device can be the multimedia transmitting equipment 300. This is will be described later.

The broadcast transmitting server 500 transmits address information of the multimedia to all receiving mobile communication terminals 100 of the area in which the multimedia message is required to be transmitted. At this time, the broadcast transmitting server 500 transmits the address information through a base station covering the area in which the multimedia message is required to be transmitted.

The broadcast transmitting server 500 can also provide the address information in the form of the cell broadcasting message by using a paging channel of a wireless channel.

Here, the address information can be a URL address of the multimedia message. The address information can also an IP address and message ID information of the multimedia transmitting equipment 300.

The base station information server 400 manages information related to the base station of the mobile communication system covering a particular area.

The base station information server 400 can receive a request for providing base station information including position information related to a specified position of an area.

If the request for providing the base station information is received, the base station information server 400 can provide the information related to the base station covering the mobile communication service of the requested area. For example, the base station information can include a cell ID of the pertinent base station.

The multimedia transmitting equipment 300 can be equipment covering the conventional multimedia message transmission, for example, the multimedia message service center (MMSC).

The multimedia transmitting equipment 300 receives the multimedia message including multimedia contents from the broadcast transmitting server 500.

As described above, the contents can include motion pictures, characters, images and melodies.

The multimedia transmitting equipment 300 stores the provided multimedia message in a separate storage space. The multimedia transmitting equipment 300 can provide address information of the multimedia message to the broadcast transmitting server 500.

Also, if the form of the provided multimedia message is not suitable for the multimedia message service, the multimedia transmitting equipment 300 can convert the form to a suitable one.

The receiving mobile communication terminal 100 can receive the address information of the multimedia message.

The receiving mobile communication terminal 100 can also access the pertinent multimedia transmitting equipment 300 by using the received address information. The receiving mobile communication terminal 100 can download the pertinent multimedia message from the accessed multimedia transmitting equipment 300.

Hitherto, the structure of the system for providing the position-based multimedia message in accordance with an embodiment of the present invention has been described with reference to FIG. 1. Hereinafter, the process of providing the position-based multimedia message service will be described in detail with reference to FIG. 2 and FIG. 3.

Figure 2:
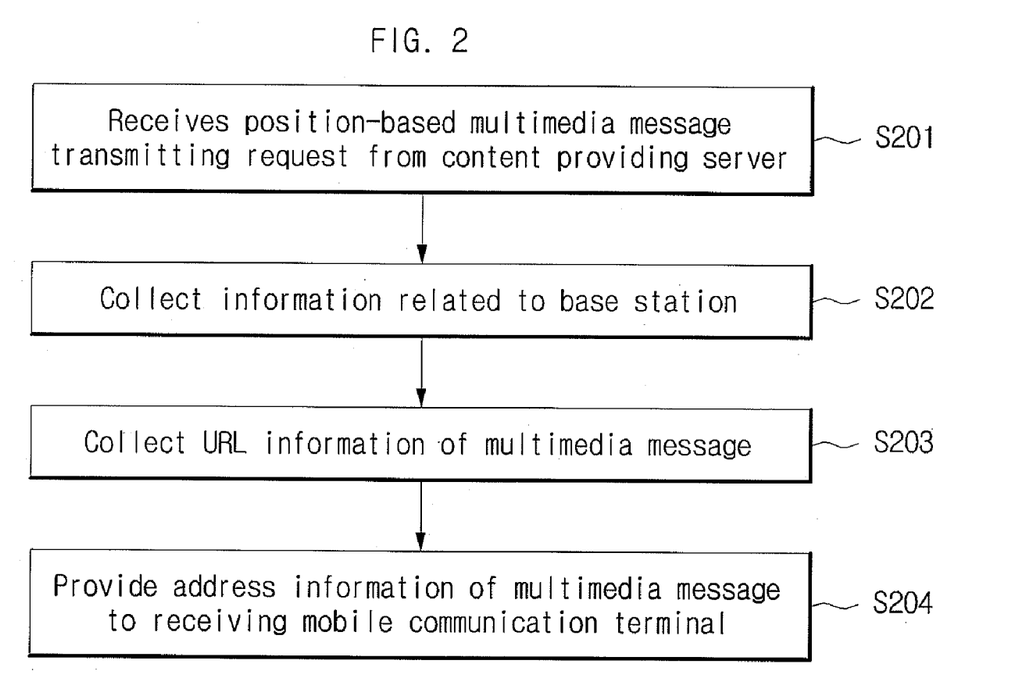
FIG. 2 is a flow chart illustrating a process of allowing a broadcast transmitting server to a position-based multimedia message service in accordance with an embodiment of the present invention.

FIG. 2 is a flow chart illustrating a process of allowing a broadcast transmitting server to a position-based multimedia message service in accordance with an embodiment of the present invention.

In a step represented by S201, the broadcast transmitting server 500 receives a position-based multimedia message transmitting request from the content providing server 600.

At this time, the broadcast transmitting server 500 can provide a response message to the request of the step represented by S201 to the content providing server 600.

In particular, the broadcast transmitting server 500 can generate a message ID as recognition information for the multimedia message and provide the generated message ID along with the response message to the content providing server 600.

In a step represented by S202, the broadcast transmitting server 500 collects information related to a base station covering an area to which the multimedia message is desired to be provided.

In this case, the broadcast transmitting server 500 can collect the information related to the base station through the base station information server 400. Here, the base station information server 400, as described above, is a separate device managing the information (e.g. a cell ID) related to the base station covering the mobile communication service of a particular area.

At this time, if it is determined that there is no information related to the pertinent area in the base station information server 400, the broadcast transmitting server 500 can provide the content providing server 600 with the information indicating that there is no information related to the pertinent area in the base station information server 400 in order to end entire steps.

The broadcast transmitting server 500 can convert the form of the multimedia message to a suitable one to meet the standard for performing the multimedia transmitting service.

This is because multimedia information provided by the content providing server 600 may have a different form or standard from multimedia information provided by the multimedia transmitting equipment 300 to the receiving mobile communication terminal 100. In case that the form or standard of the multimedia message is not converted, the multimedia transmitting equipment 300 is unable to provide the multimedia message to the receiving mobile communication terminal 100. Accordingly, the broadcast transmitting server 500 can convert the standard of the multimedia message to a suitable one for smooth transmission of the multimedia message.

In a step represented by S203, the broadcast transmitting server 500 can transfer the provided multimedia message to the multimedia transmitting equipment 300, and the multimedia transmitting equipment 300 can store the provided multimedia message.

The broadcast transmitting server 500 also collects address information of the multimedia of a multimedia broadcasting message.

Here, the address information, as described above, can be a URL address of the multimedia message and include an IP address and message ID information of the multimedia transmitting equipment 300.

In a step represented by S204, the broadcast transmitting server 500 transmits the address information of the multimedia message to the receiving mobile communication terminal 100. At this time, the address information is transmitted in a form of a cell broadcasting message.

In addition to the address information, the broadcast transmitting server 500 can further transmit base station information, which is provided by the base station information server 400, and broadcasting channel information, which can be provided to the receiver mobile communication terminal 100.

Here, the broadcasting channel information can be a value that was previously transmitted to the receiving mobile communication terminal 100 through an SMS when a user, who desires to receive a position-based multimedia message, previously subscribed to the position-based multimedia message service. In one embodiment, a receiving terminal compares a pre-stored broadcasting channel value with a broadcasting channel value transmitted from the broadcast transmitting server 500. Only if the two broadcasting channel values are identical to each other, the receiving terminal can display the multimedia message.

Then, the receiving mobile communication terminal 100 can access the multimedia transmitting equipment 300 and receive the pertinent multimedia message stored in the multimedia transmitting equipment 300 based on the address information such as URL information.

Figure 3:
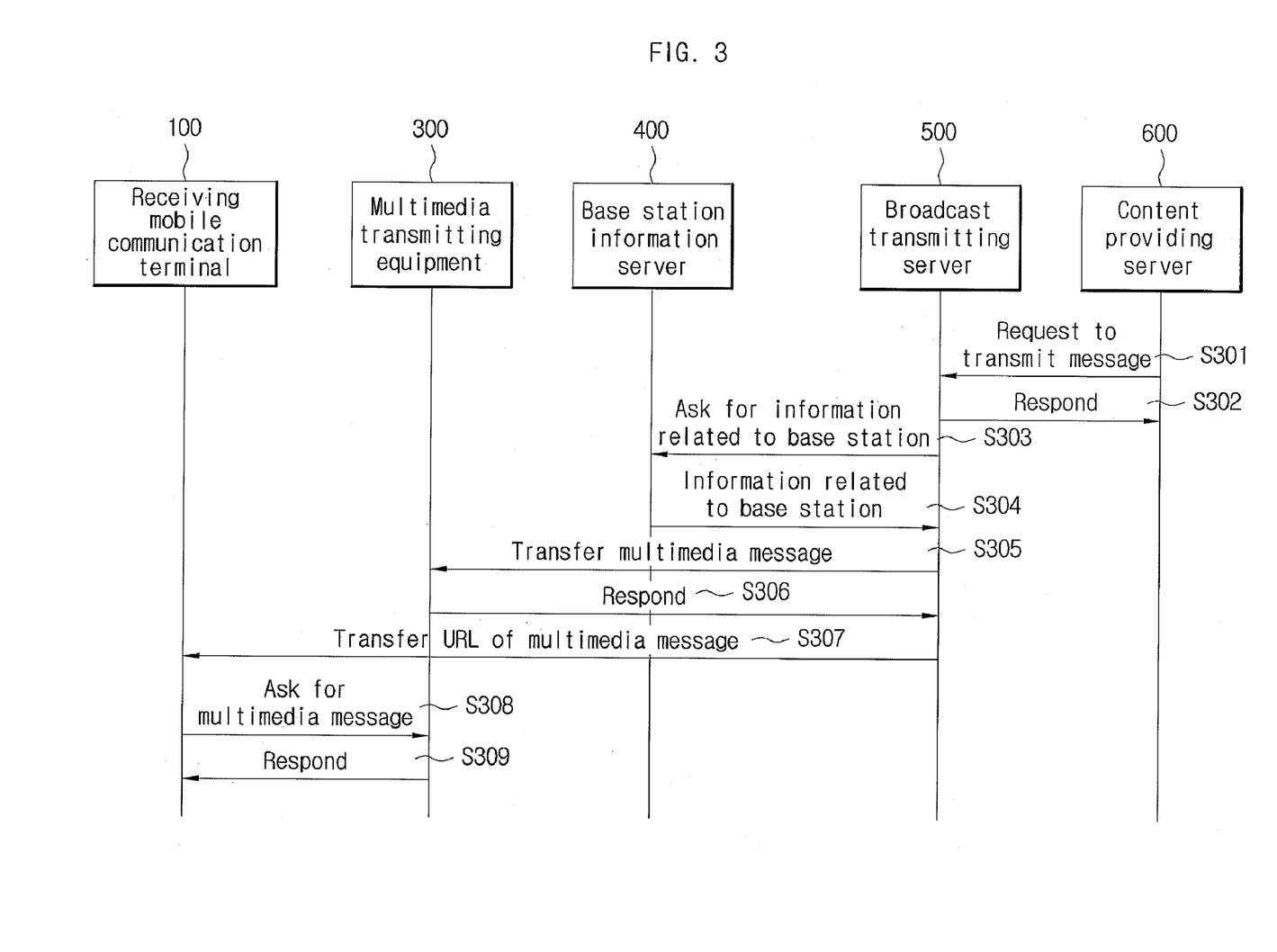
FIG. 3 illustrates a process of providing a position-based multimedia message service in accordance with an embodiment of the present invention.

FIG. 3 illustrates a process of providing a position-based multimedia message service in accordance with an embodiment of the present invention.

In steps represented by S301 and S302, the content providing server 600 transmits a position-based multimedia message transmitting request to the broadcast transmitting server 500. At this time, the broadcast transmitting server 500 provides a response message to the request to the content providing server 600.

The broadcast transmitting server 500 can generate a message ID as recognition information of the multimedia message and provides the generated message ID along with the response message to the content providing server 600.

In steps represented by S303 and S304, the broadcast transmitting server 500 provides a request for information related to the base station covering the mobile communication service of an area desired to be provided with the position-based multimedia message (hereinafter, referred to as a "broadcasted area") to the base station information server 400.

The broadcast transmitting server 500 receives the information related to the base station in response to the request. At this time, the received information related to the base station can include recognition information, for example, cell ID information, related to the base station covering a particular area.

Also, if it is determined that there is no information related to the broadcast area, which is the object of the request, in the base station information server 400, the broadcast transmitting server 500 can provide the content providing server 600 the information indicating that there is no information related to the area in the base station information server 400. In this case, all steps can be terminated.

In steps represented by S305 and S306, the broadcast transmitting server 500 transfers to the multimedia transmitting equipment 300 the multimedia message provided by the content providing server 600.

The multimedia transmitting equipment 300 can store the transferred multimedia message in a separate storage space. Also, the multimedia transmitting equipment 300 can provide the broadcast transmitting server 500 with address information of the position at which the multimedia message is stored.

Here, the address information, as described above, can be a URL address and include IP address and message ID information of the multimedia transmitting equipment 300.

The broadcast transmitting server 500 can also convert the standard of the multimedia message to a suitable one to perform the multimedia transmitting service.

Alternately, the multimedia transmitting equipment 300 can convert the standard of the multimedia message to a suitable one to perform the multimedia transmitting service.

Converting the standard of the multimedia message is for smooth transmission of the message. The detailed reason is the same as described above with reference to FIG. 2.

In a step represented by S307, the broadcast transmitting server 500 transmits the address information of the multimedia message to the receiving mobile communication terminal 100. At this time, the address information is transmitted in a form of a cell broadcast message.

In addition to the address information, the broadcast transmitting server 500 can further transmit base station information, which is provided by the base station information server 400, and broadcasting channel information, which can be provided to the receiving mobile communication terminal 100.

The same description broadcasting channel information as described above with reference to FIG. 2 will be omitted.

In steps represented by S308 and S309, the receiving mobile communication terminal 100 can access the multimedia transmitting equipment 300 and require the multimedia message based on the address information, such as URL information in the received multimedia message.

In this case, the multimedia transmitting equipment 300 can provide the pertinent stored multimedia message to the accessed receiving mobile communication terminal 100.

At this time, after receiving the address information in the step represented by S307, the receiving mobile communication terminal 100 may require the multimedia message not immediately but with a delay.

The receiving mobile communication terminal 100 can transmit to the multimedia transmitting equipment 300 a request of providing the multimedia message corresponding to the address information within a predetermined time (hereinafter, referred to as an "expired time").

This is to avoid the generation of load by simultaneously requesting to provide the multimedia messages from a plurality of mobile communication terminals 100.

Also, the multimedia transmitting equipment 300 can store the multimedia message until the set expired time only. The multimedia transmitting equipment 300 may not transmit to the terminal the multimedia message corresponding to the request received after the expired time.

Here, the expired time is determined considering a request available time from the multimedia transmitting equipment 300 to the receiving mobile communication terminal 100.

A time based on the expired time of the multimedia transmitting equipment 300 can be extracted by using a mobile directory number (MDN) or an international mobile station identity (IMSI) value.

Hitherto, the process of providing the position-based multimedia message in accordance with an embodiment of the present invention has been described with reference to FIG. 2 and FIG. 3. Hereinafter, the process of re-transmitting the multimedia message in the case of failing to provide the multimedia message will be described in detail with reference to FIG. 4 and FIG. 5.

Figure 4:
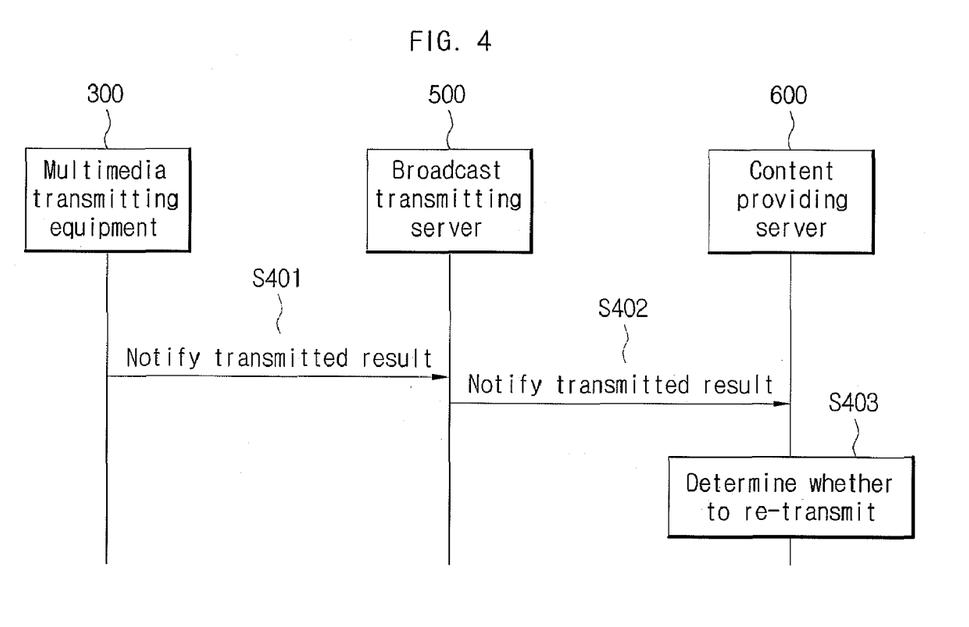
FIG. 4 illustrates a process of checking whether it is necessary to re-transmit a provided position-based multimedia message, in accordance with another embodiment of the present invention.
Figure 5:
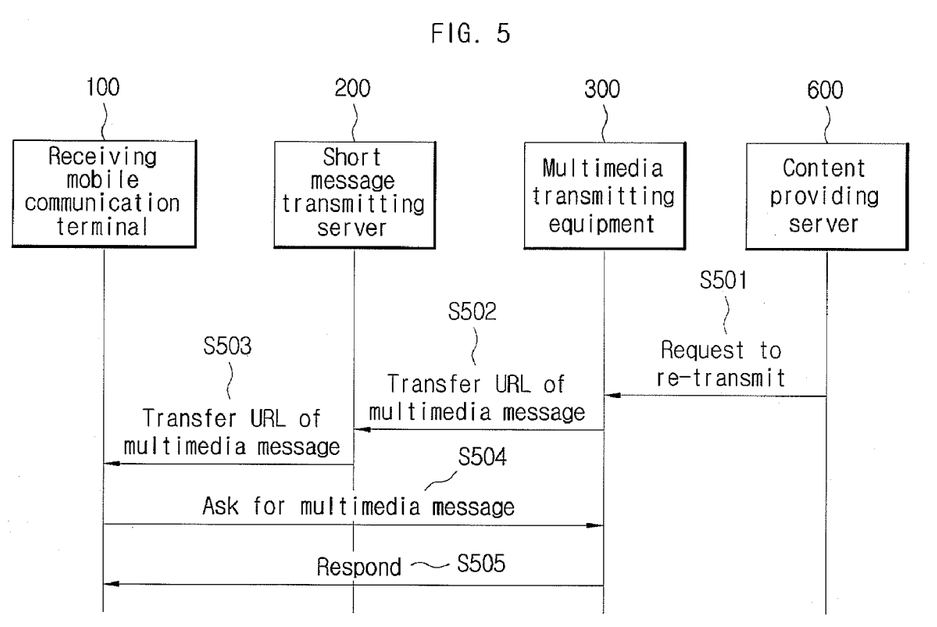
FIG. 5 illustrates a process of re-transmitting a position-based multimedia message to a receiving mobile communication terminal to which the transmission of the multimedia message has failed, in accordance with another embodiment of the present.

FIG. 4 and FIG. 5 illustrate the process of re-transmitting a multimedia message in the case of failing to provide the multimedia message according to the position-based multimedia message service in accordance with another embodiment of the present invention.

FIG. 4 illustrates a process of determining whether it is necessary to re-transmit a provided position-based multimedia message in accordance with another embodiment of the present invention, and FIG. 5 illustrates a process of re-transmitting the position-based multimedia message to a receiving mobile communication terminal to which the transmission of the multimedia message has failed, in accordance with another embodiment of the present.

Referring to FIG. 4, in a step represented by S401, in the case of completing to provide the multimedia message corresponding to the request of the receiving mobile communication terminal 100, the multimedia transmitting equipment 300 transmits the transmitted result to the broadcast transmitting server 500. Here, the transmitted result can include call number history information of the receiving mobile communication terminal 100 to which the multimedia message is completed to be transmitted.

The multimedia transmitting equipment 300 can also transmit the transmitted result after the expired time of the multimedia transmitting equipment 300.

In a step represented by S402, the broadcast transmitting server 500 can generate list information of numbers that are completed to be transmitted by unifying the transmitted results provided by a plurality of multimedia transmitting equipment 300. The broadcast transmitting server 500 can transmit the generated list information to the content providing server 600.

In a step represented by S403, the content providing server 600 can determine whether transmitting the multimedia message has succeeded, based on the transmitted list information.

For this, the content providing server 600 can compare the list information of numbers that are completed to be transmitted, provided by the broadcast transmitting server 500, with a subscriber database that the content providing server 600 has after the transmission is completed.

Referring to FIG. 5, in a step represented by S501, the content providing server 600 can determine whether it is necessary to re-transmit a multimedia message to a receiving mobile communication terminal 100. The content providing server 600 requires to re-transmit the multimedia message to the receiving mobile communication terminal 100 for which it is determined that the re-transmission is necessary.

At this time, the content providing server 600 can directly require the transmission of the multimedia message to be re-transmitted by using the call number of the receiving mobile communication terminal 100 that is the object of re-transmission.

In a step represented by S502, the multimedia transmitting equipment 300 can transfer address information of the multimedia message to a short message transmitting server 200.

In a step represented by S503, the short message transmitting server 200 transfers the transmitted address information to the receiving mobile communication terminal 100.

In a step represented by S504, the receiving mobile communication terminal 100, which has received the URL information of the multimedia message, requires the transmission of the multimedia message to the multimedia transmitting equipment 300.

In a step represented by S505, the multimedia transmitting equipment 300, which has received the multimedia message providing request, provides the pertinent multimedia message to the receiving mobile communication terminal 100. At this time, if the receiving mobile communication terminal 100 does not take the pertinent multimedia message during a predetermined period of time, the multimedia transmitting equipment 300 can periodically perform the re-transmission.

Hitherto, the process of re-transmitting the multimedia message in the case of failing to provide the multimedia message, in accordance with one embodiment of the present invention, has been described with reference to FIG. 4 and FIG. 5. Hereinafter, the broadcast transmitting server 500 providing the position-based multimedia message will be described in detail with reference to FIG. 6.

Figure 6:
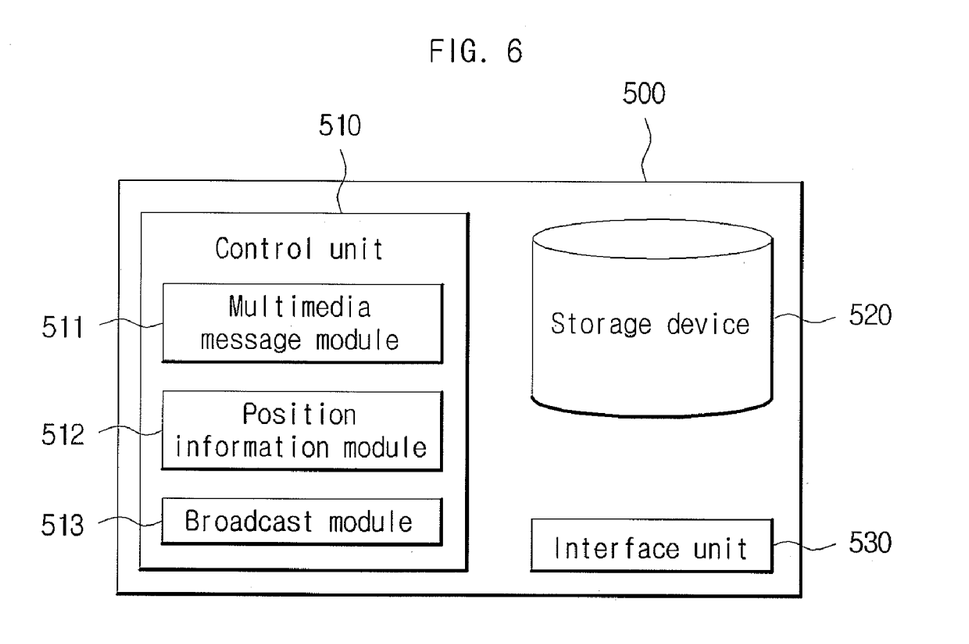
FIG. 6 is block diagram illustrating the structure of a broadcast transmitting server providing a position-based multimedia message in accordance with another embodiment of the present.

FIG. 6 is block diagram illustrating the structure of a broadcast transmitting server providing a position-based multimedia message in accordance with another embodiment of the present.

Referring to FIG. 6, the broadcast transmitting server 500 can include a control unit 510, a storage device 520 and an interface unit 530. The control unit 510 can include a multimedia message module 511, a position information module 512 and a broadcast module 513.

The multimedia message module 511 receives multimedia message information from the content providing server 600. Also, the multimedia message module 511 can store the transferred multimedia message information in a database.

Also, the multimedia message module 511 can convert the standard of the transferred multimedia message information to a suitable one for the multimedia message transmission.

The position information module 512 collects information related to the base station covering an area to which the position-based multimedia message, required to be transmitted from the content providing server 600, is desired to be provided.

Also, the position information module 512 can check for an error in a position that is the object of transmission request.

The broadcast module 513 can transfer the position-based multimedia message to the multimedia transmitting equipment 300 and collect address information of the multimedia message from the multimedia transmitting equipment 300.

The broadcast module 513 can also transmit the collected address information in a form of a cell broadcasting service message to the receiving mobile communication terminal 100 located in a transmission request area according to the information related to the base station.

Here, the broadcast module 513 can provide the collected base station the address information in the form of the cell broadcasting service through a paging channel.

The storage device 520 stores multimedia message information, managed by the multimedia message module 511, and base station information, managed by the position information module 512.

The interface unit 530 allows the broadcast transmitting server 500 to exchange information and communicate with the receiving mobile communication terminal 100, the multimedia transmitting equipment, the base station information server and the content providing server 600 around the broadcast transmitting server 500.

At least one embodiment of the present invention can easily provide a large-sized multimedia message to a plurality of mobile communication terminals located in a place by using a cell broadcasting service in the current mobile communication system.

While the above description has pointed out novel features of the invention as applied to various embodiments, the skilled person will understand that various omissions, substitutions, and changes in the form and details of the device or process illustrated may be made without departing from the scope of the invention. Embodiments of the invention can also be applied to non-video data. Therefore, the scope of the invention is defined by the appended claims rather than by the foregoing description. All variations coming within the meaning and range of equivalency of the claims are embraced within their scope.

What is claimed is:

1. A position-based multimedia message transmitting service method, comprising:
   receiving a request of transmitting a position-based multimedia message from a content providing server;
   collecting information related to a base station covering an area to which the requested position-based multimedia message is provided;
   transferring the position-based multimedia message to a multimedia transmitting equipment;
   collecting address information of the position-based multimedia message from the multimedia transmitting equipment;
   transmitting the collected address information in a form of a cell broadcasting service message to at least one receiving mobile communication terminal, located in the area, according to the base station information;
   obtaining a list of phone numbers of the at least one receiving mobile communication terminal to which the collected address information has been transmitted;
   providing the list to the content providing server;
   receiving a request of re-transmitting the multimedia message, based on the generated list from the content providing server; and
   requesting a short message transmitting server to provide the address information to the receiving mobile communication terminal.

2. The method of claim 1, further comprising providing the content providing server with a response message including a message ID recognizing the position-based multimedia message, according to the request of transmitting the position-based multimedia message.

3. The method of claim 1, wherein the base station information comprises cell ID information, which is recognition information related to a base station covering a mobile communication service of the pertinent area.

4. The method of claim 1, wherein the address information comprises an IP address of the multimedia transmitting equipment and ID information of the multimedia message.

5. The method of claim 1, wherein the transferring comprises converting the position-based multimedia message to be suitable for a communication standard for performing the multimedia message transmitting service.

6. The method of claim 1, wherein the transmitting comprise transmitting the base station information and the broadcast channel information, which can be provided to the receiving mobile communication terminal.

7. The method of claim 1, wherein the transmitting comprises transmitting information related to a range of time, during which the receiving mobile communication terminal can request the multimedia transmitting equipment to provide the pertinent multimedia message.

8. The method of claim 1, further comprising accessing, at the receiving mobile communication terminal, the multimedia transmitting equipment so as to receive the multimedia message, based on the address information.

9. A broadcast transmitting server, comprising:
a multimedia message module configured to receive position-based multimedia message information from a content providing server;
a position information module configured to collect information related to a base station covering an area, to which a position-based multimedia message that is requested to be transmitted from the content providing server, is provide;
a broadcast module configured to i) transfer the position-based multimedia message to a multimedia transmitting equipment, ii) collect address information of the position-based multimedia message from the multimedia transmitting equipment and iii) transmit the collected address information in a form of a cell broadcast service message to a receiving mobile communication terminal located in the area, according to the base station information; and
a module for receiving a request of re-transmit the multimedia message from the content providing server if the multimedia message has not been successfully transmitted so as to request a short message transmitting server to provide the address information to the receiving mobile communication terminal.

10. The server of claim 9, wherein the multimedia message module is further configured to convert the message information to be suitable for a communication standard for performing a multimedia message transmitting service.

11. The server of claim 9, wherein the position information module is further configured to check for an error in a position of the area covered by the base station.

12. A broadcast transmitting server, comprising:
a first device configured to receive position-based multimedia message information from a content providing server;
a second device configured to obtain information related to a base station covering an area, to which a position-based multimedia message that is requested to be transmitted from the content providing server is provided;
a third device configured to i) transmit the position-based multimedia message to a multimedia transmitting equipment, ii) obtain address information of the position-based multimedia message from the multimedia transmitting equipment and iii) transmit the address information to a receiving mobile communication terminal located in the area, according to the based station information; and
a fourth device configured to receive a request of re-transmit the multimedia message from the content providing server if the multimedia message has not been successfully transmitted so as to request a short message transmitting server to provide the address information to the receiving mobile communication terminal.

13. The server of claim 12, wherein the address information comprises at least one of the following: i) a uniform resource locator (URL) address of the multimedia message, ii) an IP address of the multimedia transmitting equipment and iii) message ID information of the multimedia transmitting equipment.

14. A broadcast transmitting server, comprising:
means for receiving position-based multimedia message information from a content providing server;
means for obtaining information related to a base station covering an area, to which a position-based multimedia message that is requested to be transmitted from the content providing server is provided; and
means for transmitting the position-based multimedia message to a multimedia transmitting equipment;
means for obtaining address information of the position-based multimedia message from the multimedia transmitting equipment;
means for transmitting the address information to a receiving mobile communication terminal located in the area, according to the information related to the base station; and
means for receiving a request of re-transmit the multimedia message from the content providing server if the multimedia message has not been successfully transmitted so as to request a short message transmitting server to provide the address information to the receiving mobile communication terminal.

15. The server of claim 14, wherein the address information comprises at least one of the following: i) a uniform resource locator (URL) address of the multimedia message, ii) an IP address of the multimedia transmitting equipment and iii) message ID information of the multimedia transmitting equipment.

* * * * *